J. W. HAINLINE.
TRAY ATTACHMENT FOR BLACKBOARDS.
APPLICATION FILED MAR. 26, 1908.
923,262.
Patented June 1, 1909.
2 SHEETS—SHEET 1.
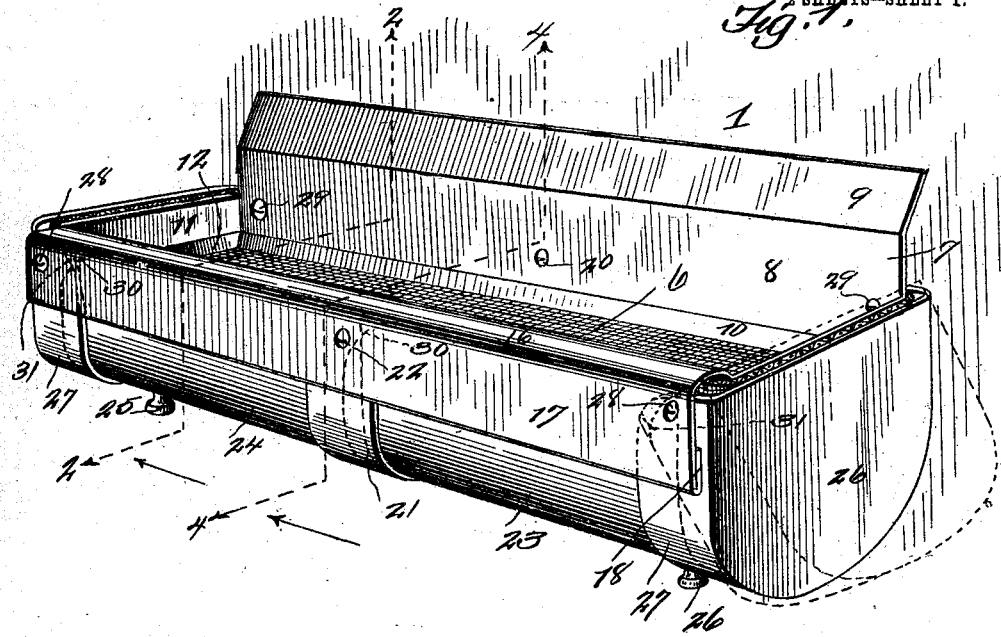
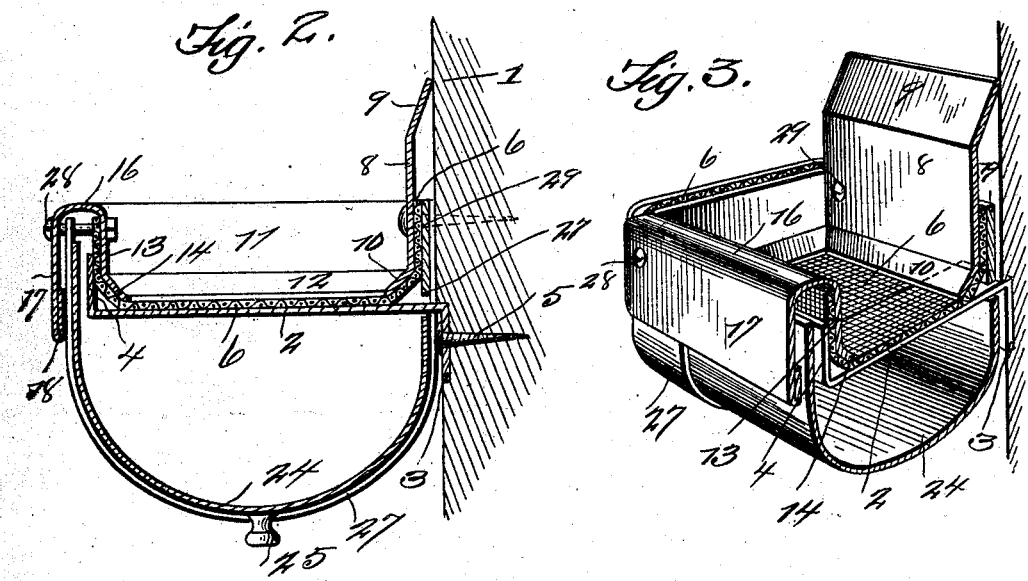
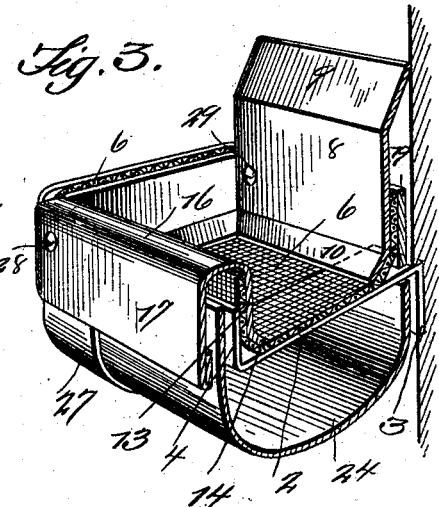
Inventor
John W. Hainline.
By F. J. Larson & Co
Attorneys
Witnesses
R. S. Boswell
M. E. Connor J. W. HAINLINE.
TRAY ATTACHMENT FOR BLACKBOARDS.
APPLICATION FILED MAR. 26, 1908.
923,262.
Patented June 1, 1909.
2 SHEETS—SHEET 2.
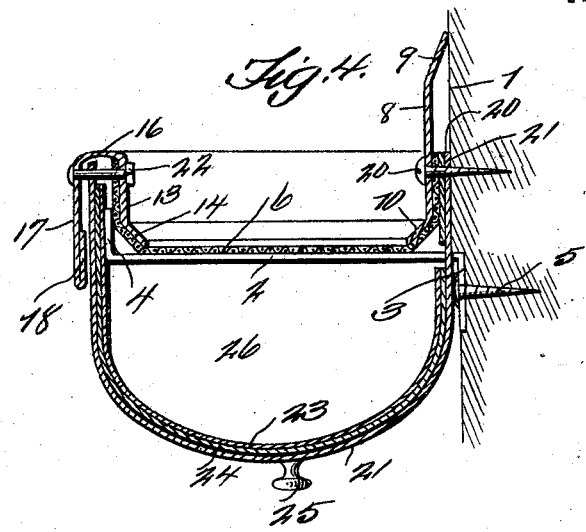
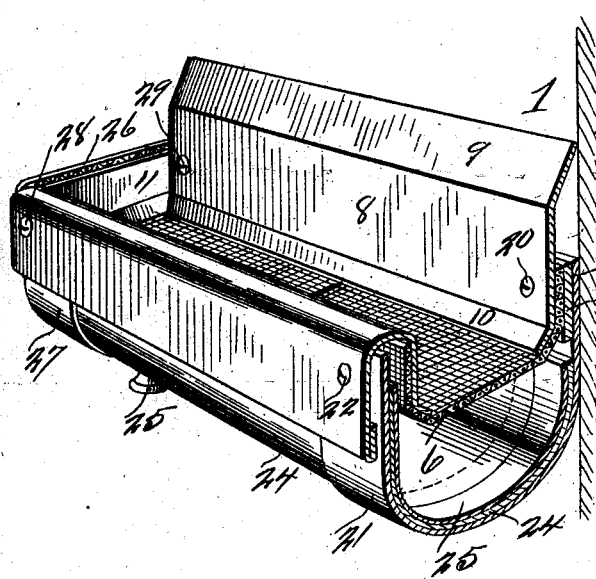
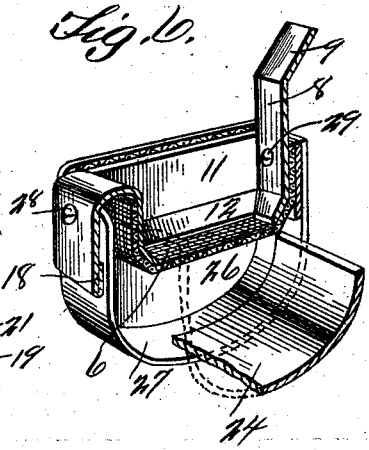
Witnesses
Inventor
John W. Hainline
By F. J. Larson & Co.
Attorneys

UNITED STATES PATENT OFFICE.

JOHN W. HAINLINE, OF LA JUNTA, COLORADO.

TRAY ATTACHMENT FOR BLACKBOARDS.

No. 923,262.        Specification of Letters Patent.        Patented June 1, 1909.

Application filed March 26, 1908. Serial No. 423,416.

*To all whom it may concern:*

Be it known that I, JOHN W. HAINLINE, a citizen of the United States, residing at La Junta, in the county of Otero and State of Colorado, have invented certain new and useful Improvements in Tray Attachments for Blackboards, of which the following is a specification.

This invention pertains to certain new and useful improvements in tray attachments for blackboards, and has for its object to generally simplify, lessen the cost of manufacture, increase the efficiency and provide a thoroughly practical device of this type.

A further object of the invention is to provide for the easy removal and replacement of the chalk dust collecting trays, there being two sections of the latter employed, either of the same being removable and replaceable without disturbing the other.

In the drawings:—Figure 1, is a perspective view of the invention, Fig. 2, is a sectional view taken on line 2—2 of Fig. 1, Fig. 3, is a view taken on the same line 2—2 of Fig. 1, but showing the parts in perspective, Fig. 4, is a sectional view taken on line 4—4 of Fig. 1, Fig. 5, is a view taken on the same line as Fig. 4, but showing the parts in perspective, and Fig. 6, is a fragmentary perspective.

The blackboard to which the device is applied, is designated 1, and to the latter is secured brackets 2, having opposite right angular ends 3, 4, the former of which is countersunk in the blackboard and secured thereto as by fastenings 5, and the latter of which contributes partial support for the foraminous trap or screen 6. The bottom of screen 6, rests upon and receives support from the horizontal portions of the brackets 2, the latter being enployed in such numbers as is demanded by the length of the screen 6.

7 denotes an open frame for screen 6, which is formed with a wide back plate 8 having its upper end portion inclined as at 9 so as to closely engage with the board 1, and has its lower end portion disposed at an opposite inclination as at 10 to direct the chalk dust onto screen 6. The ends 11, of frame 7, likewise have their lower end portions inclined inwardly and downwardly as at 12, for a similar purpose which is also true of the side 13, as indicated at 14. The side 13, of the frame is formed with an extension 15, which extends outwardly and then downwardly as at 16, and 17, respectively, its end being folded over as at 18 to present a finished appearance and to add strength and rigidity.

In order to afford a firm substantial seating for the back plate 8, there is interposed between the rear upturned end of the side of screen 6, a strip 19, fastening means as 20, being projected through plate 8, the screen 6, and strip 19, and the rear end of the U-shaped bracket 21, by means of which the said parts are obviously secured in unison to the board 1.

Bracket 21, supports the imperforate tray sections at their inner overlapping ends being disposed for this purpose central of the length of frame 7. The outer end of bracket 21 extends upwardly in the space between side 13 and its extension 17 of the frame and is supported by a bolt 22, which passes through said side and extension 17 thereof, the bolt at the same time extending through the end portion of the outer side of screen 6. It will be observed that the mesh material of screen 6 is drawn taut or stretched so as to closely engage about the frame 7.

23 and 24 designate the imperforate tray sections each of approximate U-shape and provided with knobs 25, 26 to assist in the manipulation thereof. As shown more clearly in Figs. 4 and 5, the tray sections 23 and 24 are in overlapped or telescopic relation whereby they are conjointly supported by the bracket 21. The ends of the tray designated 26, are each formed with a marginal inwardly extending flange 27 whose purpose and function are to receive the outer ends of the tray sections and support the same against downward movement. Bolts 28 extend through the end of the flanges 27, at the point where the latter extend in the space between side 13 and its extension 17, of the frame 7, and screws 29, through the ends of flanges 27, where the latter enter the space as shown in Fig. 2, between bracket 27 and the side of screen 6. Thus the ends of the trays are pivotally connected to the frame 7 and related parts as set forth enabling the ends to be turned outwardly to the position indicated by dotted lines Fig. 1. As shown in dotted lines at 30, the tray sections 23, 24 have their ends rounded so as to more easily be brought into overlapped relation, this being also true of the inner ends of flanges 27, of ends 26, which are also rounded as at 31, so as to lessen any possibility of interference when swinging ends 26 to normal position.

In operation it will be noted that by mere outward movement of either of ends 26 on their pivotal points will enable the correspondingly located tray section to be removed without disturbing the other tray, which eliminates the awkward practice of removing a single tray of a length difficult to manipulate when the collected chalk dust and particles are to be removed.

What is claimed is:—

1. A device of the type set forth embodying an open frame, a screen secured to said frame, a plurality of tray sections, means to support the inner adjacent ends of said sections, and means at the ends of the frame to support the outer ends of said sections, said means being movable to permit said sections to be removed and replaced independent of one another.

2. A device of the type set forth consisting of a frame, a screen carried by the frame, tray sections, means to support the adjacent ends of said sections and pivoted ends for said trays having means to support the outer ends thereof.

3. A device of the type displayed consisting of a frame having a screen bottom, a bracket central of the length of said frame, tray sections having their adjacent ends overlapped and supported by said bracket, and pivoted ends for the outer ends of said tray sections having inwardly extending flanges on which said tray ends seat and are supported.

4. A device of the type set forth, composed of a frame, a plurality of tray sections having their adjacent ends arranged in contacting relation, means carried by the frame to support said sections at their point of contact, and means at the outer ends of the sections to support same and to allow removal and replacement of any one of the tray sections independent of the other.

5. A device as set forth embodying an open frame having a back, front and ends, said back being extended upwardly and said front being extended outwardly and downwardly, a bracket secured to said back and extending in the space between said front and its extension, and a tray supported from said bracket.

6. A device as set forth embodying a frame having a back, and a front formed with an extension which projects outwardly and then downwardly, a bracket secured to the back and in the space between the front and its extension, and a tray supported from said bracket and having the top of its front side extending in the space between said frame front and its extension.

7. In combination with a frame having a foraminous bottom, tray sections having adjacent ends in overlapped relation, and elements for closing the outer ends of the trays and for supporting said outer ends, said elements being movable so as to permit individual removal and replacement of the trays.

8. A device of the type set forth embodying a frame having a back, a foraminous bottom, and a front having an extension which projects outwardly and downwardly, a plurality of tray sections having the upper free end parts of their fronts disposed on the rear of said extension of said frame front, and means to secure said tray sections in position.

9. A device of the type set forth embodying a frame, a pair of tray sections having their adjacent ends arranged in contacting relation, means to support said adjacent ends of the tray sections, and combined means to support the outer ends of said tray sections and to provide closures for said outer ends of the tray sections.

10. A device of the type set forth embodying a frame, tray sections arranged to have their adjacent ends overlap, means to support said tray sections from an intermediate point on said frame, and means carried by said frame for supporting the outer ends of the tray sections.

In testimony whereof I affix my signature, in presence of two witnesses.

JOHN W. HAINLINE.

Witnesses:
JOHN E. TURNER,
JOHN J. ALLISON.